US012567507B2

(12) United States Patent
Ito et al.

(10) Patent No.: US 12,567,507 B2
(45) Date of Patent: Mar. 3, 2026

(54) ELECTRICAL PENETRATION

(71) Applicant: Hitachi-GE Nuclear Energy, Ltd., Hitachi (JP)

(72) Inventors: Shingo Ito, Hitachi (JP); Yasuyuki Goto, Hitachi (JP); Yukiharu Sato, Hitachi (JP); Teppei Kubota, Hitachi (JP); Masayuki Shimizu, Tokyo (JP); Susumu Kumagai, Tokyo (JP); Atsushi Warigaya, Tokyo (JP); Masamichi Idonuma, Tokyo (JP); Kenta Kimura, Tokyo (JP)

(73) Assignee: Hitachi GE Vernova Nuclear Energy, Ltd., Hitachi (JP)

( * ) Notice: Subject to any disclaimer, the term of this patent is extended or adjusted under 35 U.S.C. 154(b) by 180 days.

(21) Appl. No.: 18/501,674

(22) Filed: Nov. 3, 2023

(65) Prior Publication Data

US 2024/0153656 A1 May 9, 2024

(30) Foreign Application Priority Data

Nov. 4, 2022 (JP) ................................ 2022-177497

(51) Int. Cl.
*G21C 17/00* (2006.01)
*G21C 13/028* (2006.01)
(Continued)

(52) U.S. Cl.
CPC ........... *G21C 17/01* (2013.01); *G21C 13/028* (2013.01); *G21C 13/04* (2013.01); *G21C 17/116* (2013.01)

(58) Field of Classification Search
CPC ...... G21C 17/01; G21C 13/028; G21C 13/04; G21C 17/116
See application file for complete search history.

(56) References Cited

U.S. PATENT DOCUMENTS

| | | | | |
|---|---|---|---|---|
| 10,910,118 | B2 * | 2/2021 | Brun | G21C 13/036 |
| 2014/0030902 | A1 | 1/2014 | Baudelocque et al. | |
| 2018/0163728 | A1 * | 6/2018 | Zugelder | E21B 43/12 |

FOREIGN PATENT DOCUMENTS

| | | | | |
|---|---|---|---|---|
| CA | 998128 A | | 10/1976 | |
| CA | 2435716 C | * | 7/2006 | H01R 13/523 |

(Continued)

OTHER PUBLICATIONS

JPH11153688A ; English Translation; published in 1999 (Year: 1999).*

(Continued)

*Primary Examiner* — Pete T Lee
(74) *Attorney, Agent, or Firm* — Crowell & Moring LLP

(57) ABSTRACT

To provide an electrical penetration capable of being used in nuclear power plants which are designed assuming operation under conditions of the severe accident. An electrical penetration includes: a tubular sleeve member 10; two or more insulating seal members 20A and 20B arranged inside the sleeve member 10 so as to be spaced from each other; wiring members 60, 60 disposed along the longitudinal direction of the sleeve member 10 so as to extend across two insulating seal members of the two or more insulating seal members 20A and 20B; and outer seal members provided inside the sleeve member 10 and at the outermost portions of the two insulating seal members 20A and 20B. The wiring members 60, 60 are each covered with an insulator made of the same material as those of the outer seal members 21A and 21B.

5 Claims, 2 Drawing Sheets

(51) Int. Cl.

| | |
|---|---|
| ***G21C 13/04*** | (2006.01) |
| ***G21C 17/01*** | (2006.01) |
| ***G21C 17/116*** | (2006.01) |

(56) References Cited

FOREIGN PATENT DOCUMENTS

| | | | |
|---|---|---|---|
| JP | 2010-60430 | A | 3/2010 |
| JP | 2014-48229 | A | 3/2014 |
| JP | 2017-70199 | A | 4/2017 |

OTHER PUBLICATIONS

Extended European Search Report issued in European Application No. 23207966.5 dated Mar. 26, 2024 (7 pages).

* cited by examiner

ELECTRICAL PENETRATION

CLAIM OF PRIORITY

The present application claims priority from Japanese patent application serial no. 2022-177497 filed on Nov. 4, 2022, the content of which is hereby incorporated by reference into this application.

FIELD OF THE INVENTION

The present invention relates to an electrical penetration.

DESCRIPTION OF RELATED ART

As an electrical cable penetration (hereinafter, referred to also as "electrical penetration") used in nuclear power plants, nuclear fuel reprocessing plants, and the like (hereinafter, referred collectively to as "nuclear power plants, etc."), there is proposed an electrical penetration requiring replacement of only a defective cable (see JP 2014-048229 A).

The electrical penetration to be used in the nuclear power plants, etc. requires insulation performance in addition to the above-mentioned cable replaceability. Furthermore, in a case where the electrical penetration is used in nuclear power plants, devices such as measuring instruments connected to the electrical penetration are required to continuously function even when any accident occurs under commercial operation of the nuclear power plants.

It has been studied that the nuclear power plants are designed on the assumption of a severe accident which is referred to also as "SA" (for example, the Fukushima No. 1 nuclear power plant accident at the Great East Japan Earthquake (2011) is defined as the SA). As a matter of course, devices to be used for a containment vessel are required to continuously function under conditions of the severe accident. To this end, the electrical penetration connected to such devices is required to have desired electrical characteristics necessary for the devices to continuously function even at the severe accident.

SUMMARY OF THE INVENTION

The present invention has been made in response to the above issues, and an object thereof is to provide an electrical penetration capable of being used in nuclear power plants which are designed assuming operation under conditions of the severe accident.

To achieve the above object, the present invention provides the following.

An electrical penetration according to the present invention includes: a tubular sleeve member; two or more insulating seal members arranged inside the sleeve member so as to be spaced from each other; a wiring member disposed along the longitudinal direction of the sleeve member so as to extend across the two or more insulating seal members; and an outer seal member provided inside the sleeve member and at the outermost portions of the two or more insulating seal members. The wiring member is covered with an insulator made of the same material as that of the outer seal member.

Advantages of the Invention

According to the present invention, the wiring member is covered with the insulator made of the same material as that of the outer seal member, so that the electrical penetration can have electrical characteristics allowing peripheral devices to continuously function even at the severe accident. In other words, the electrical penetration of the present invention can be used in nuclear power plants which are designed assuming operation under conditions of the severe accident.

DETAILED DESCRIPTION OF THE PREFERRED EMBODIMENTS

First Embodiment

Hereinafter, an electrical penetration 1 according to a first embodiment of the present invention will be described with reference to FIG. 1. The electrical penetration 1 according to the present embodiment is used under a radiation environment, particularly, in a nuclear power plant.

Figure 1:
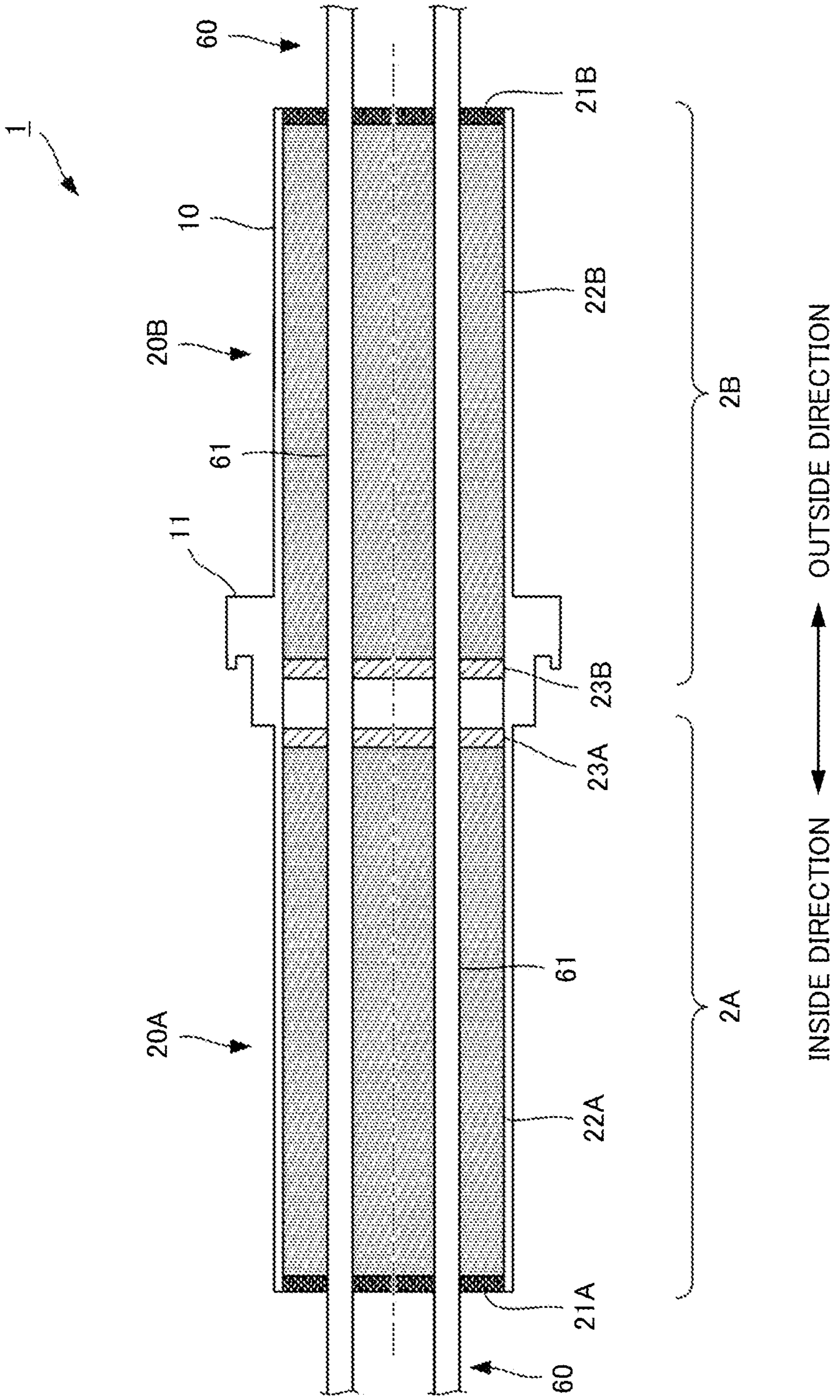
FIG. 1 is a schematic drawing of a cross-sectional view for explaining the configuration of an electrical penetration according to a first embodiment of the present invention.

FIG. 1 is a schematic drawing of a cross-sectional view for explaining the configuration of the electrical penetration 1 according to the first embodiment of the present invention. As illustrated in FIG. 1, the electrical penetration 1 has a sleeve member 10, two insulating seal members 20A and 20B, and wiring members 60, 60.

The sleeve member 10 is a tubular member formed using a metal material such as a stainless steel. In the present embodiment, it will be described that the sleeve member 10 is formed into a cylindrical member as an example.

A half part of the electrical penetration 1 in the inside direction of a wall of a containment vessel that has the insulating seal member 20A is referred to also as a primary seal part 2A. And the other half part of the electrical penetration 1 in the outside direction of the wall of a containment vessel that has the insulating seal member 20B is referred to also as a secondary seal part 2B.

A flange part 11 is a member used when the sleeve member is attached to a wall-through part of a containment vessel. The flange part 11 protrudes radially outward from the outer peripheral surface of the sleeve member 10 and extends in the circumferential direction of the outer peripheral surface of the sleeve member 10.

The insulating seal members 20A and 20B are arranged inside the sleeve member 10 so as to be spaced from each other. The insulating seal members 20A and 20B are members for airtight sealing between the inner and outer sides of the sleeve member 10. The insulating seal member 20A is disposed at the inner-side opening end of the sleeve member 10, and the insulating seal member 20B is disposed at the outer-side opening end of the sleeve member 10.

The insulating seal members 20A and 20B respectively have outer seal members 21A and 21B, resin members 22A and 22B, and plate members 23A and 23B, which are arranged sequentially from both ends to the center of the sleeve member 10.

The outer seal members 21A and 21B are members formed in a layer and respectively cover the surfaces of the resin members 22A and 22B on the opening end side.

The outer seal members 21A and 21B are preferably made of the same material as that of an insulator constituting the wiring member 60. This makes the insulation resistance of the wiring member 60 unlikely to be lowered at the severe accident, making it possible to maintain the operation state of peripheral devices connected to the electrical penetration 1. Further, the outer seal members 21A and 21B are preferably made of a material having the same thermal expansion coefficient as that of the insulator constituting the wiring member 60. This can enhance the airtightness of the inside of the electrical penetration 1.

Examples of the material constituting the outer seal members 21A and 21B include a polymer containing tetrafluoroethylene and ethylene-propylene-diene rubber. Examples of the polymer containing tetrafluoroethylene include a cross-linking copolymer of tetrafluoroethylene and polyolefin.

The outer seal members 21A and 21B each preferably have a thickness capable of withstanding a pressure difference at the severe accident, preventing permeation of high-temperature steam thereto and maintaining satisfactory construction quality.

In the present embodiment, the outer seal members 21A and 21B are each formed in a single layer structure. However, the outer seal members 21A and 21B may each have a multilayer structure.

The resin members 22A and 22B are disposed respectively between the outer seal member 21A and plate member 23A and between the outer seal member 21B and plate member 23B and provide airtight sealing therebetween. The resin members 22A and 22B are formed using thermosetting resin. In particular, in the present embodiment, the resin members 22A and 22B are formed using epoxy resin.

The plate members 23A and 23B are formed in a plate-like shape and respectively cover the surfaces of the center side of the resin members 22A and 22B. The plate members 23A and 23B are formed using ceramics or the like, for example.

The wiring members 60, 60 extend outside from the opening end of the sleeve member 10. The number of the wiring members 60 may be changed depending on the number of conductors.

Specifically, the wiring members 60, 60 extend from the opening end of the sleeve member 10 in the inside direction toward the opening end thereof in the outside direction, which then extend to the outside of the electrical penetration 1.

The wiring member 60 has an insulation resistance that can pass steam exposure test assuming the sever accident. The wiring members 60, 60 each have a wiring conductor (not illustrated) formed using wires of a tinned annealed copper and an insulator 61 covering the periphery of the wiring conductor. The wiring conductor in the present embodiment is formed by concentrically or collectively twisting a plurality of metal wires of a tinned annealed copper or the like.

The insulator 61 is preferably made of the same material as those of the outer seal members 21A and 21B. Examples of the material constituting the insulator 61 include a polymer containing tetrafluoroethylene and ethylene-propylene-diene rubber. Examples of the polymer containing tetrafluoroethylene include a cross-linking copolymer of tetrafluoroethylene and polyolefin.

By the presence of the insulator 61 made of such a material, the wiring member 60 can have electrical characteristics allowing peripheral devices connected to the electrical penetration 1 to continuously function even under the severe accident. That is, the wiring member 60 can have an insulation resistance that can pass steam exposure test assuming the sever accident. Thus, even when the severe accident occurs, peripheral devices connected to the electrical penetration 1 can continuously function under conditions of the severe accident.

In particular, when the insulator 61 is made of a cross-linking copolymer of tetrafluoroethylene and polyolefin, and the polyolefin in the cross-linking copolymer is polypropylene, the electrical penetration 1 can have a high insulation resistance value during and after the steam exposure test whose conditions are set based on the severe accident and can further have high withstand voltage characteristics and high anti-leakage characteristics, as compared with when the polyolefin in the cross-linking copolymer is a polymer other than polypropylene.

In the present embodiment, the insulator 61 is formed using a cross-linking copolymer containing polypropylene as a polyolefin.

In the present embodiment, the insulator 61 is formed in a single layer structure. However, the insulator 61 may have a multilayer structure.

The following describes evaluation results on the thus configured electrical penetration 1. For comparison of the evaluation results, the configuration of an electrical penetration 201 as a comparison target is illustrated in FIG. 2.

Figure 2:
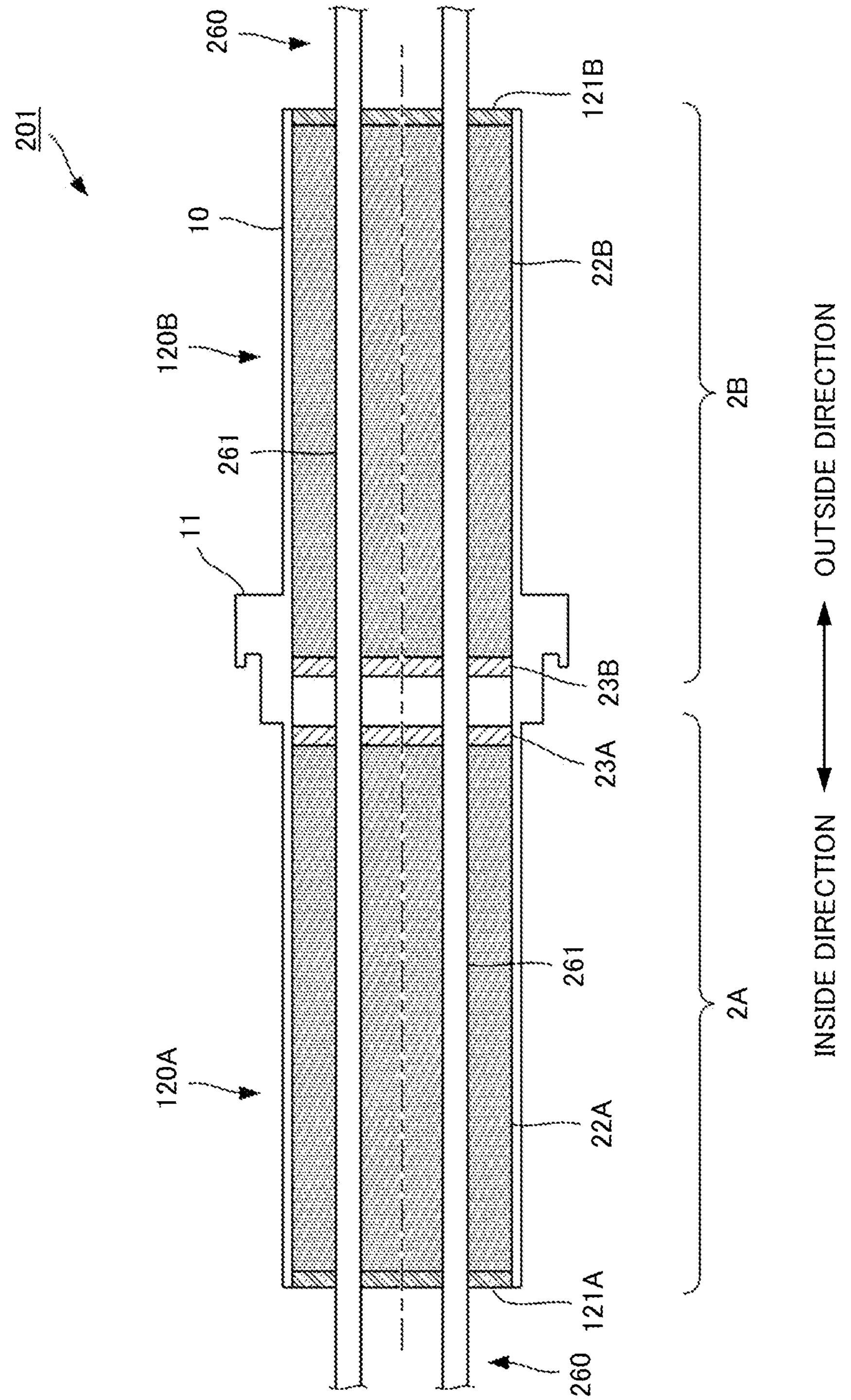
FIG. 2 is a schematic drawing of a cross-sectional view for explaining a configuration of an electrical penetration as a comparison target.

As illustrated in FIG. 2, the electrical penetration 201 differs from the electrical penetration 1 in that it has two insulating seal members 120A, 120B and wiring members 260, 260 in place of the insulating seal members 20A and 20B and wiring members 60, 60. Other configurations of the electrical penetration 201 are the same as those of the electrical penetration 1.

In the wiring member 260, an insulator 261 covering the periphery of the wiring member differs from the insulator 61 of the wiring member 60 in that it is formed using a polyolefin resin component. Other configurations of the wiring member 260 are the same as those of the wiring member 60.

The insulating seal members 120A and 120B differ from the insulating seal members 20A and 20B in that outer seal members 121A and 121B are each formed using chlorosulfonated polyethylene.

Results of the steam exposure test that was carried out for the electrical penetration 1 according to the present embodiment and the electrical penetration 201 will be described. The electrical penetration 1 used in the steam exposure test was provided with ten wiring members 60.

The steam exposure test was carried out under conditions (in the case of a boiling water reactor) that the target electrical penetration was exposed to an atmosphere of 240° C. for 10 minutes and then to an atmosphere of 200° C. for 168 hours (seven days). In a case where insulation resistance values before and after steam exposure in the electrical penetration 1 were larger than an insulation resistance value after steam exposure in the electrical penetration 201 as a comparison target, the electrical penetration 1 was determined to have an insulation resistance that can pass the steam exposure test assuming the severe accident.

The insulation resistance value before steam exposure was larger in the electrical penetration 1 than in the electrical penetration 201 by $1.0\times10^{3}$ times or more. Meanwhile, the insulation resistance value before steam exposure in the electrical penetration 1 refers to the average value of the insulation resistance values of the ten wiring members 60.

The insulation resistance value after steam exposure was larger in the electrical penetration 1 than in the electrical penetration 201 by $1.0\times10^3$ times or more. As stated above, the insulation resistance value after steam exposure in the electrical penetration 1 refers to the average value of the insulation resistance values of the ten wiring members 60.

The above results reveal that the electrical penetration 1 has an insulation resistance that can pass the steam exposure test assuming the severe accident. In other words, the electrical penetration 1 can be suitably applied as an electrical penetration that can maintain insulation performance even in the event of the SA.

The electrical penetration 1 can maintain a specified insulation resistance value during and after steam exposure whose conditions are set based on the SA and can further have high withstand voltage characteristics and high anti-leakage characteristics after steam exposure.

The technical scope of the present invention is not limited to the above-described embodiments, and various modifications can be made without departing from the spirit of the present invention. For example, the present invention may be applied, without being limited to the above embodiment, to an embodiment obtained by combining the above embodiments.

What is claimed is:

1. An electrical penetration comprising:

a tubular sleeve member;

two or more insulating seal members arranged inside and along the longitudinal direction of the sleeve member so as to be spaced from each other;

a wiring member disposed along the longitudinal direction of the sleeve member so as to extend across the two or more insulating seal members;

ceramic plate members formed in a platelike shape and so as to respectively cover surfaces of a center side of the two or more insulating seal members, and an outer seal member provided inside the sleeve member and at the outermost portions on an opening end side of the two or more insulating seal members so as to respectively cover surfaces of the two or more insulating seal members, the wiring member being covered with an insulator made of the same material as that of the outer seal member.

2. The electrical penetration according to claim 1, wherein the insulator covering the wiring member is made of a polymer containing a cross-linking copolymer of tetrafluoroethylene and polyolefin.

3. The electrical penetration according to claim 1, wherein the outer seal member is made of a polymer containing a cross-linking copolymer of tetrafluoroethylene and polyolefin.

4. The electrical penetration according to claim 2, wherein the polyolefin is polypropylene.

5. The electrical penetration according to claim 3, wherein the polyolefin is polypropylene.

* * * * *